3,112,216
ELECTROSTATIC SPRAYING
Lester L. Spiller, Indianapolis, Ind., assignor to Ransburg Electro-Coating Corp., Indianapolis, Ind., a corporation of Indiana
No Drawing. Filed Jan. 15, 1959, Ser. No. 789,469
31 Claims. (Cl. 117—93.4)

The present invention relates to improvements in electrostatic spraying of paint and other coating compositions and is particularly directed to the modification of paint compositions including the provision of new paint compositions to achieve improved electrostatic sprayability.

The invention includes methods for electrostatic spraying in which the paint composition is adjusted to provide at least partially ionizable chemical complexes providing under the influence of a field of electrostatic forces a charged component of more limited electrophoretic mobility than its counter ions, the presence of these charged particles modifying the interaction between the paint composition and a unidirectional electrostatic field, to cause the paint composition to be more efficiently sprayed under the influence of electrostatic force.

The invention improves electrostatic spraying by employing an electrostatic spray principle in which the composition being sprayed interacts with the field of electrostatic forces in an improved manner. The invention improves the electrostatic sprayability of paint compositions which previously were only poorly sprayable as evidenced by the formation of one or more of excessively large particles or gobs of paint, narrow spray band width or poor "wraparound," these terms being defined hereinafter.

The invention still further permits the effective electrostatic spraying of paint and other coating compositions at higher viscosity than is presently used commercially for electrostatic atomization and even at higher viscosity than is normally used commercially with conventional mechanical spray equipment.

The invention further includes new paint compositions which are specifically adapted for electrostatic atomization and deposition as well as the modification or upgrading of existing paints for this same purpose.

At the present time electrostatic spraying is carried out by either mechanically atomizing the paint and then depositing the atomized spray particles in an electrostatic field in order to increase the proportion of the spray particles which are deposited upon the object to be coated, or by atomizing under the influence of an electrostatic field and electrostatically depositing the spray particles. The present invention is particularly applicable to this latter system in which, as is well known, an electrostatic charge is passed through an increment of the paint, usually in the form of a film, to a grounded article to cause the paint to be disrupted to form a spray of fine paint particles which deposit upon the article to form a film of paint thereupon.

In electrostatic spraying as it is presently practiced and particularly when electrostatic atomization is employed, it has been found that a number of paint compositions which are sold in large volume such as ordinary housepaints and highly pigmented interior decorators paints do not spray with sufficient efficiency to meet commercial requirements. Although some paints respond to electrostatic atomization better than other paints, considerable effort has been made to extend the electrostatic atomization process to include additional paints and to improve the spray efficiency of those paints which do spray reasonably well.

Prior electrostatic atomization normally utilized low solution viscosity of about 15–30 seconds as measured in a #4 Ford cup at 77° F. As a result it was necessary to use large proportions of volatile thinners to dilute the liquid medium of the paint. Low viscosity paint tends to run and sag when applied in desirably increased thickness and this limits conventional spraying (both mechanical and electrostatic) to the production of coatings of limited thickness.

Others previously have observed for a limited number of liquid materials that compositions with conductivity too high or too low were less atomizable by electrostatic means than those of intermediate conductivity, and that resinous solutions of higher dielectric constant were easier to spray by electrostatic means than were very non-polar liquids.

The investigations leading to the present invention have confirmed that electrical conductivity and dielectric constant are some of the factors related to, or necessary consequences of, the conditions which control electrostatic sprayability. Thus, many additives, for example polar solvents, may be added to paints for the purpose of adjusting the characteristics of the paint continuum and electrostatic sprayability may sometimes be improved in this manner. In many instances, the additives which may be used impair the quality of the paint film and the application characteristics of the paint in various other ways, or the proportion in which the additives must be employed to achieve a significant improvement of electrostatic sprayability is unduly large and excessively costly.

In the present invention, a paint of a given polar solvent content and including ionizable complexes in accordance with the present teachings possesses superior electrostatic sprayability when compared with the same paint but without the complexes. Moreover, smaller proportions of polar solvent permit a given improvement in electrostatic sprayability to be obtained.

It has generally been found that the character of the particulate matter which is dispersed as a component in the liquid continuum of the paint rarely influences electrostatic spraying. Where effects are observed, ordinarily they more often degrade rather than improve the sprayability of the liquid continuum by electrostatic means.

Surprisingly, in accordance with the present invention, it has been found that there may be established a unique co-action between the liquid components of the paint and the dispersed particulate component (solid particle or colloidal micelle) of the paint to form electrostatically influenced complexes which are distributed to create electrical discontinuities or localized portions throughout the volume of the paint, which localized portions coact with and augment the electro-atomizing effect of an electrostatic field, and thereby provide an improved electrostatic spray.

THE INVENTION

In accordance with the present invention, paint or other coating compositions containing a film-forming component are provided to include complexes which ionize in the paint continuum, at least upon application of a unidirectional electrostatic potential, to provide large charged particles of limited electrophoretic mobility having a multiplicity of charges of one charge sign per particle and smaller neutralizing counter-ions of opposite charge and valence, usually less than 4, which, at least in part, are distributed in the liquid continuum in the vicinity of the larger oppositely charged particles. The invention is primarily directed toward compositions which are poorly sprayable by electrostatic means, either at ordinary or higher viscosity, and is, therefore, principally concerned with compositions in which the film-forming component has a dielectric constant less than 10, particularly less than 7, since these compositions are most beneficially altered. The unidirectional electrostatic field acts upon both the sluggish and mobile charged particles to produce localized tensions or stresses therebetween thus physically joining portions of the liquid continuum to a particulate component dispersed in the liquid continuum. In this manner the action of the electrostatic field is concentrated and electrostatic atomization is promoted. This improved interaction between the paints and coating compositions of the invention and the electrostatic field will be more fully described hereinafter. The charged particles and neutralizing counter-ions of the invention are desirably provided by three interacting components namely, (1) a particulate component, (2) a strong hydrogen bonding component or one which can be strongly adsorbed by the particles of the first component, and (3) a polar material of high dielectric constant which is compatible with the continuum of the paint.

THE PARTICULATE COMPONENT

The first component is a colloidal particle or micelle having a diameter of at least about 1000 A., this particle or micelle being dispersed in the paint continuum. As will later more fully appear, the second component becomes associated with the colloidal particles or micelles. This association may be by hydrogen bonding or through the agency of strong adsorptive forces.

When association with the second component is by hydrogen bonding, the particulate component must possess hydrogen sufficient to form a large number of hydrogen bonds to surrounding molecules. Preferred colloidal particles of the type under consideration fall within the class of acidic clays typified by montmorillonite clay. More generally, the acidic clays which are referred to are finely divided materials containing hydrous oxides of amphoteric metals such as aluminum, silicon or iron. One or more of these acid clays may be added to the paint composition to assist in dispersing the pigment particles and are particularly desirable for this purpose when the paint is loaded with pigments such as titanium dioxide or iron oxide pigments.

The acidic clays which are referred to contain displaceable protons in sufficient number to show an acid reaction with indicator dyes in either an aqueous or non-aqueous medium in which the clay is dispersed; the acidity or displaceable proton capacity of such clays being measured by titrating mixtures of clay and dispersing liquid medium with alkali in the presence of an indicator like crystal violet.

Preferred acidic clays are those exhibiting comparatively high base-exchange properties. These include the montmorillonites, e.g., sodium, potassium, lithium and other bentonites such as Wyoming bentonite, magnesium bentonite and saponite. Other clays are montronite, attapulgite, illite, zeolites and fuller's earths.

The base exchange capacities of the various clays enumerated runs from about 15 to about 100 milliequivalents of exchangeable ions per 100 grams of clay.

In addition to acidic clays, such as those referred to hereinbefore, other particulate material having a valency toward hydrogen bonding with a plurality of electron donors may be employed. These are illustrated by chelate and clathrate compounds with polyvalent metals such as titanium chelates like triethanolamine titanate or clathrate complexes produced by reaction between urea and vegetable oil fatty acids. Also, resinous components of high molecular weight forming colloidal micelles and which have a capacity toward hydrogen bonding may be used. These are illustrated by aldehyde condensation products with phenol, urea, melamine, dicyandiamide and benzoguanamine which are cooked with drying oils so as to be only partially soluble in the paint continuum providing colloidal fragments or micelles in the paint.

When association with the second component is intended to be by adsorption, the particulate component may be constituted by any one or more of the particulate materials referred to as having a capacity for hydrogen bonding or by any one or more particles of large surface area such as conventional metal oxide pigments which are represented by iron oxide or titanium oxide, or by extenders and fillers, such as talc.

THE SECOND COMPONENT

In one form of the invention, the second component bonds with the colloidal particles constituting the first component through a hydrogen bond, the second component providing the pair of electrons which are required to establish the bond. The second component must possess a strong capacity for hydrogen bonding.

The capacity of various components for hydrogen bonding has been measured by W. Gordy et al. (see J. Chem. Physics, vol. 9, pages 207–214). Gordy compared the hydrogen bonding acceptancy of various materials relative to methanol in benzene solution by observing the degree of perturbation of the ordinary vibrational frequency of the O—D bond of $CH_3OD$ when benzene was replaced as the solvent by the other material being rated. (A heavy hydrogen methanol, $CH_3OD$, was used instead of $CH_3OH$ because the OD bond is more convenient for spectroscopic isolation than the O—H which can get confused with irrelevant hydrogens present.) Gordy diluted 1 mol of methanol to 1000 cc. of solution in benzene, to obtain in the infra-red spectrum a reference wave length peak. When other liquids of greater hydrogen acceptance (or greater electron donor) capacity were substituted for benzene, the wave length peak shifted to a lower frequency (or longer wave length) than was characteristic in benzene solution, and the change in frequency (or wave length) expressed as $\Delta\gamma$ in reciprocal centimeters (or $\Delta\eta$ in microns) was found to be a more sensitive measure than are most other methods of rating the hydrogen bonding acceptancy of the materials for the deuterium atom in the reference compound deutero-methanol.

On this Gordy scale, the strong hydrogen bonding materials which are employed as the second component in accordance with the invention exhibit an increase in wave number expressed in reciprocal centimeters of over 125, preferably over 200. Preferred strongly hydrogen bonding materials falling within this definition are the quaternary ammonium hydroxides such as dimethyl dioctadecyl ammoninum hydroxide, amines such as octadecyl amine and oxime compounds such as ethyl methyl ketoxime, acetoxime, 2-butanone oxime, trimethoxyboroxime, dimethyl glyoxime and alphapiccoline. The primary amines are preferred although the secondary and tertiary amines as well as hydroxyl amines such as octadecyl hydroxyl amine may be used with less effectiveness. Amides such as octadecyl amide may also be employed. Polyamines such as tallow-aliphatic-diamine and polyamides such as the reaction product of dimeric fatty acids with aliphatic diamines are also useable.

Additionally, aliphatic, cyclic, aromatic and heterocyclic amines and polyamines as well as quaternary ammonium compounds may be used as the second component. These are illustrated by octadecylamine, cyclohexylamine, octyl phenyl amine, pyrrole, tetraethylene pentamine and octadecyl ammonium chloride.

Compounds having a molecular weight in excess of 300 are preferred.

As a result of interaction between the colloidal particles of the first component which provides hydrogen ions or other electron acceptors which tend to bond with a plurality of electron donors, as typified by an acidic clay, and the strong hydrogen bonding component, as typified by a quaternary ammonium hydroxide, these components become associated. The reaction is recognized as an acid-base combination between proton donor and acceptor, or between electron donor and acceptor. The resulting complex may or may not become ionized. The extent of ionization, if any, is regarded as a consecutive reaction which follows the primary reaction of complex formation.

The reaction product of the first and second components may be formed in situ or preformed. Thus, the acidic clays as illustrative of the first component may be reacted with onium base compounds which are isologs of ammonium. Phosphonium, arsonium, stibonium, oxonium, sulfonium, selenonium, stannonium and iodonium compounds such as base salts, illustrated by octylphosphonium iodide and free salts, illustrated by octyl phosphonium, may be reacted with acidic clays to form complexes usable in accordance with the invention.

In addition to the association between the second component and first component taking place by virtue of hydrogen bonding as discussed hereinabove, this association may take place as a result of strong adsorptive forces. Thus, the second component may be constituted by amphoteric metal soaps typified by zinc employed in the form of a solvent-soluble soap, e.g., zinc naphthenate. These amphoteric metal solvent-soluble soaps are strongly adsorbed by particles having large surface areas such as conventional metal oxide pigments as well as by other particulate materials having large surface areas such as those referred to hereinbefore as having a capacity for hydrogen bonding. Other soaps which may be used are aliphatic monocarboxylates such as oleates, linoleates, palmitates and resinates of zinc, and other amphoteric metals such as calcium and like metal soaps of the conventional mixed soap-forming fatty acids derived from vegetable and fish oils. Metal soaps possessing drier activity such as cobalt naphthenate and lead naphthenate are not usable. Moreover, the soaps having drier activity reduce the effectiveness of the non-drier soaps and preferably should be absent from the paint to enable the adsorption and disassociation mechanism to proceed with the non-drier soaps. Various other compounds having a Gordy number in excess of 125 such as the amines and amides previously referred to may be used and bound to particulate dispersed matter, such as metal oxide pigment, by adsorption.

THE THIRD COMPONENT

The third component is a polar material of high dielectric constant which is dissolved in the paint continuum and which functions to facilitate dissociation of the complex formed between the first two components into ions without disrupting the union which exists therebetween. The third component has the further purpose of providing a liquid medium of high dielectric constant in the vicinity of the large charged particles of the same sign which are formed by said dissociation. This enables electrical forces to interact between these charged particles of limited electrophoretic mobility and their oppositely charged counter-ions which are largely confined by electrical attactive forces to the portions of the paint continuum lying adjacent the large charged particles. In this manner the large charged particles become surfaced with charges of one sign and surrounded with mobile particles of opposite sign providing what is known as a "double layer."

It is desired to point out that water is normally present in association with the particles which are distributed within the continuum of the paint. It is possible that the water which is associated with the particles is responsible for the observation that electrostatic sprayability is largely independent of the characteristics of the dispersed particulate matter. It is also possible that the dissolved third component which enables the dispersed particles to coact with the surrounding continuum in a manner improving electrostatic spraying achieves this result by an action which includes modification of the water associated with the particles.

The polar materials which are employed as the third component in accordance with the invention should possess a dielectric constant in excess of about 8. Preferably, the dielectric constant should be between 20 and 40.

When the association between the first and second components is established by virute of a hydrogen bonding mechananism, it is essential that the hydrogen bonding capacity of the third component should be less than the hydrogen bonding capacity of the second component as indicated by a Gordy number of less than 100 preferably less than 50. The reason for this will be immediately apparent when it is considered that the function of the third component is to facilitate dissociation of the complex formed between the first and second components into oppositely charged ions as opposed to the displacement of the second component from the first component by the third component.

When association between the first and second component is achieved through the agency of strong adsorptive forces, the maximum Gordy number of the third component becomes less critical for the reason that there is no opportunity for displacement of the second component to take place as a result of the third component having a stronger capacity for hydrogen bonding.

On the other hand, it is still preferred to employ a third component having a Gordy number less than 100, preferably less than 50, for the reason that such materials have a lesser capacity to become associated with themselves or with other components such as solvent components existing in the paint continuum. The third component is illustrated by polar solvents such as mitroparaffins, esters such as butyl acetate and ketones. Typical preferred solvents which function well in accordance with the invention at low polar solvent concentration are acetyl acetone, methyl ethyl ketone, nitroparaffins such as nitromethane and nitropropane, acrylonitrile monomer and acetonitrile.

The third component is intended to function to facilitate dissociation of the complex of the first two components and this dissociation function is achieved by a combination of third component concentration, polarity, dielectric constant and electromeric structure. Generally, the greater the polarity and dielectric constant, and the lower the Gordy number of the third component, the less of the third component is required to provide an effective improvement in electrostatic atomization.

PROPORTIONS

The proportion of the components which associate with one another to form charge-concentrating complexes may vary considerably, it being preferred to employ as little as possible of these components so as to minimize modification of the basic characteristics of the paint which is improved.

With respect to the colloidal particles and with particular reference to the acidic clays, these may be present in an amount not exceeding 10% by weight based on the weight of the paint. Desirably, less than 2% and preferably about 1% of the weight of the paint composition is constituted by the acidic clay. At least about 0.1% of the paint should be constituted by the acidic clay to provide an adequate number of ionizable complexes.

The second component having a strong hydrogen bonding capacity may be present in an amount of from 0.1% up to 5% based on the weight of the paint. Desirably, 1% by weight of the second component is used since this is normally ample for the purposes of the invention. Preferably, the proportion of the second component should not exceed by an amount in excess of 50% that amount which is dictated by the stoichiometry of the base exchange rating of the first component which measures the total number of hydrogen bonds which can be formed between the particulate or first component and a stoichiometric excess of the second component.

When the second component is an amphoteric solvent-soluble metal soap, it has been found that very small proportions are effective. Thus, as little as 0.0001% based on the weight of the paint is generally adequate. Preferably from .001-0.1% by weight is used. While larger amounts of 1% up to about 5% may be used, this is not necessary and is wasteful.

The third component which is normally a polar organic liquid should be dissolved in the liquid continuum of the paint in an amount sufficient to effect at least partial ionization of the complex of the first two components. Desirably, at least about 3% by weight based on the weight of the paint should be present. Preferably, this liquid should be a solvent for the film-forming resinous constituents of the paint. Desirably, the polar organic liquid is present in an amount of at least 300% based on the combined weights of the first two components.

Using the preferred materials characterized by a Gordy number of less than 50, it is preferred to employ not more than 8% by weight. Up to about 25% by weight of polar solvent may be present but even with less preferred solvents having a Gordy number of around 90, from 10-15% by weight is ample for the purpose of the invention. It should be kept in mind that there must be superimposed upon the requirements of the invention the desire in the paint industry to employ a minimum quantity of polar solvent in any practical paint formulation.

CONDUCTIVITY

The continuum of the paint must conduct an electric current and it does this through the presence of mobile ions. The paint will thus possess a conductivity which is measurable irrespective of whether the electrical current is alternating or direct. In the invention, the direct current conductivity assumes greater importance because the charged particles of the invention are displaced by the direct electrical current to transmit such a current through the paint medium whereas these charged particles provide little if any conductivity with respect to an alternating electrical current which has no orienting influence. Instead, the alternating electric current is primarily transmitted through the agency of mobile ions which are uniformly distributed throughout the paint continuum.

Direct current conductivity is measured by subjecting a column of the paint 3⁄8 inch in diameter and 12 inches long to a direct current potential of 100 kilovolts using brass electrodes having a surface area of 0.11 square inch. The conductivty of the paint is measured by observing the microamperes of current which flow through the column of paint.

The direct current conductivty is measured substantially immediately after imposition of the test voltage. This is consistent with electrostatic spraying practice in which the paint film is constantly being renewed so that no opportunity for extensive movement and electrophoretic deposition of complexes of limited mobility can occur in practice.

Paints containing charge-concentrating complexes in accordance with the invention should preferably possess a direct current conductivity measured as indicated hereinbefore of at least 5 microamperes.

Alternating current conductivity is measured using a polyethylene tube 2 7⁄16 inches long, having an I.D. of 3⁄4 inches and fitted with a pair of brass electrodes at either end. These each have a surface area of .44 square inch. The tube is filled with paint, giving a paint column 3⁄4 inches in diameter and 1 3⁄4 inches long. The tube is then mounted vertically and an alternating current potential of 2 kilovolts at a frequency of 1000 cycles per second is passed through the paint column. The conductivty of the paint is measured by observing the microamperes of current which flow through the paint column.

THE NEW PHYSICAL COACTION

Conventional mechanical spraying using hand spraying equipment generally employs liquids having viscosities of 18-25 seconds or at most up to about 30 seconds measured in a #4 Ford cup at room temperature because it is only with these fluid liquids that the kinetic energy supplied is sufficiently great with respect to the viscosity of the ejected stream as to cause the stream to be adequately disrupted. In rare instances paints having viscosities up to 60 seconds have been sprayed mechanically, but usual spray viscosity is much lower as indicated despite the obvious advantage inherent in employing maximum tolerable solution viscosity. When paint solutions are excessively viscous, spraying produces excessively large particles or gobs of paint and, with highly cohesive resins cobwebbing may result. Thus, the solutions must be thinned further to be sprayable and this thinning reduces solvent economy and only thin films may be produced without running or sagging. This limitation in mechanical spraying is well known and is referred to in British Patent 763,158 to E. I. du Pont de Nemours, dated December 12, 1956.

The invention achieves satisfactory atomization at higher solution viscosity than has been commercially used in electrostatic spraying.

In the invention, the polar solvent is non-uniformly distributed in the continuum of the paint with the highest levels of the microscopic concentration gradients being around the charged colloidal particles which are provided through complex dissociation. When a unidirectional electrostatic field is imposed the large immobile charged particles provide a condition where charge density of one sign is high on a particle, and the particle with a multiplicity of like charges can move only slowly toward one electrode, while the small and diffused opposite charges are more free to move, but they are retarded from doing so by their attraction to the particulate core of opposite charge. It is believed that there is created a tension or strain in the fluid medium due to the unidirectional electrical field acting on the double layer in the vicinity of the charged colloidal particles. Separation of particulate charge from its swarm of counter-ions is enhanced when the dielectric constant of the continuum is high for some considerable element of volume around the particulate charge carrier. These factors may be reflected to a degree in measurements of the conductivity or dielectric constant of the paint. As a result of this electrical strain, the fluid material in the immediate vicinity of the complex may stiffen, producing a localized increase in viscosity which can be termed a positive electro-viscous effect.

The electrostatic propelling forces are thus concentrated in highly viscous areas and propulsion is initially more strongly resisted. The propelling forces are thus caused to build up to produce a more vigorous propulsion achieving filaments of finer diameter and which may contain fluid flowing at higher velocity. At some critical balance between filament diameter, velocity and surface charge, the flow of the fluid medium of the filament ceases to be laminar and becomes turbulent, which assists the shattering of the filaments. The fragments of the filaments reduce their surface area by withdrawing into spheres of minimum volume. The presence of the charged particles promotes the development of the filaments in which this fragmentation occurs in such a manner as to cause optimum atomization.

The filament formed by the initial propelling forces contains the electrically charged particles and these may respond to secondary mechanical and electrical propelling forces which may be in various directions because the hpysical orientation of the charged particles may have been disturbed when these particles were drawn into the filament. Thus, as the filament extends from the leading edge of the charged paint film, portions of it may be sped up and other portions may be laterally deflected so that the filament between the portions acted upon by the secondary propelling forces is attenuated and whipped about. The physical results of secondary propulsion are such as to be observable. In conventional electrostatic atomization it is easily seen that the filaments which are formed are straight establishing the absence of point propulsion and lateral repulsion.

Wavy or curly filaments may be produced when electrical charges are sufficiently concentrated in accordance with the invention. The many points of filament projection and lateral repulsion are easily observed when the filaments are photographed as is the fine atomization which is achieved. While wavy or curly filaments are not essential to the invention, they are usually present when the preferred compositions of the invention are electrostatically sprayed.

The new electrostatic spray mechanism of the invention leads to many important and valuable results. Electrostatic atomization is improved permitting poorly sprayable paints to be sprayed well and sprayable paints to be sprayed better. Paints of higher viscosity may be sprayed and binders formerly causing difficulty can be better handled. Higher pigment loading can be tolerated. Finer particle size leads to more uniform spray deposits and increased "wraparound" which is the ability of the charged particles to turn around and coat the rear of the object being painted. "Wraparound" will be more specifically defined hereinafter. Also, more viscous solutions can now be sprayed (up to about 60–120 seconds measured in a #4 Ford cup at 77° F.) and this leads to a saving in solvent and also to the production of thicker films as a result of the reduced tendency of the more viscous paints to run and sag. Also, since the filaments are efficiently disrupted, resins which could not previously be sprayed at practical concentrations can now be sprayed in economic manner and without cobwebbing. Electrostatic atomization is made more efficient irrespective of the resin which is selected to constitute the film-forming component of the paint.

PAINT COMPOSITIONS

The invention embraces various types of paints and coating compositions. Thus, conventional paints in which the film-forming resin component is present in solution in volatile organic solvent medium may be modified in accordance with the invention in order to improve sprayability by electrostatic force. Similarly, the organic solvent may be non-volatile as in volatile-free paint compositions which are now achieving increasing importance. Further, the film-forming resinous component may be present in solid particulate form dispersed in a liquid medium which is non-volatile and which plasticizes the resin upon baking at elevated temperature and this liquid medium may contain or be free of volatile componets. Thus, the invention may be adapted to the electrostatic spraying of plastisols and organosols to improve the electrostatic sprayability of such compositions. The term "paint" is used generically to include both air drying and baking or stoving finishes.

A number of representative paints and other coating compositions which may be modified in accordance with the invention to provide improved electrostatic sprayability are included in the examples.

EVALUATION OF ELECTROSTATIC SPRAYING

To evaluate electrostatic spraying is not a simple task. One reason for this is the fact that atomization and deposition cannot be segregated and fully measured independently of one another. Thus, efforts to find a single measurement which would correlate directly and accurately with the merit of a paint in electrostatic spraying have not been successful. On the other hand, several factors have been found to be of importance both to atomization and deposition.

Related principally to atomization is the average diameter of the particles which are produced. This is determined by photographing the spray particles in flight and measuring the diameter of a number of the particles photographed to obtain an average. In general, the finer the particles, the better the overall electrostatic sprayability. However, deposition is also important and particle diameter alone does not provide a sufficiently accurate correlation with the judgment of experienced observers.

The particles which are projected must spread out as they move to the grounded target to form a band. Using a bell-shaped spray head, the band is circular or doughnut-shaped and the band can be measured across the width of a segment of the circle. In general, the wider the band, the better the over-all electrostaic sprayability. Again, a sufficiently accurate correlation between band width and expert judgment is not obtained.

An important attribute of electrostatic spraying is the ability of the spray particles to be deflected and to deposit upon the target despite the fact that the initial path of the particle is such as to miss the target. This improved deposition is evidenced to a marked extent by the fact that some of the particles which do miss the target are deflected around the target to deposit on the rear thereof. This factor termed "wraparound" is of particular value in the painting of objects like chair legs and wire fencing. A measure of wraparound may be obtained by moving past the spray head at controlled speed two identical strips, one of which shows only one face to the spray head and the other of which is positioned in an opening to permit spray particles to pass through and then wrap around to deposit on the rear of the strip. The strips are then suitably baked and wraparound is calculated according to the formula:

$$\text{Percent wraparound} = \frac{\text{Wt. of paint on back strip}}{\text{Wt. of paint on front strip}} \times 100$$

In general, the higher the wraparound, the better the overall electrostatic sprayability but correlation of wraparound by itself with expert judgment is not sufficiently accurate.

It has been found that excellent correlation with expert evaluation is had when all three factors discussed above are combined into a single "figure of merit" according to the formula:

$$\text{Figure of merit} = \frac{\text{Band width (inches)} \times \text{Wraparound (percent)}}{\text{Particle size (diameter in thousands of an inch)}}$$

In this formula an increase in band width or wraparound or a decrease in particle size will all increase the figure of merit. The figure of merit tends to range from about 1 for bad paints to about 60 or more for excellent paints with an error of about ±5 providing an excellent correlation with expert evaluation. In brief, an increase in figure of merit of about 10–15 determines a significant improvement in electrostatic sprayability which is easily observed by those experienced in the art and the numerical figure itself can be used as a reliable guide to classify a paint as bad, fair, good or excellent for electrostatic spray purposes. The figure or merit thus measures the ability of the paint to be atomized and deposited as a film.

11
ILLUSTRATIONS OF THE INVENTION

*Example I*

The invention is well illustrated employing a long oil alkyd resin paint dissolved in a non-polar solvent medium which is a typical poorly sprayable paint.

The specific paint tested was as follows:

| | Parts |
|---|---|
| Titanium dioxide, rutile | 31.7 |
| Pure, long oil, soya alkyd (60% resin solids) | 50.7 |
| Driers (.2 cobalt naphthenate plus .6 lead naphthenate) | .8 |
| Mineral spirits | 16.8 |
| | 100 |

NOTE.—All parts specified in the examples are by weight.

The long oil soya alkyd used in Example I was produced by direct fusion of the raw materials (60% soya fatty acids, 22.2% phthalic anhydride, and 17.8% pentaerythritol) in a reaction kettle heated to 435° F. The kettle was equipped with an agitator and cover to permit the use of a blanket of inert gas above the resin. The mixture was held at reaction tempertaure until an acid value of from 3–6 was reached. At the completion of the reaction, the resin is pumped into a thinning kettle and reduced with mineral spirits to 60% resin solids.

The above resin solution in a roller mill together with titanium dioxide pigment and resin solution in proportions of 1:1 was ground to a fineness of 7, measured on the Hegman fineness gauge, and the resulting paint base was thinned to spraying consistency with other constituents of the above formula.

When it was desired to incorporate polar solvents in the paint of Example I, the polar solvent components were added during the last operation in the production of the paint, e.g., in the step of thinning to spray viscosity. When it was desired to incorporate acidic clay, strong hydrogen bonding components or complexes of these such as bentonite salt, these were added to the pigment and ground together with the pigment into the film-forming resin.

The paint of this example thinned with mineral spirits to a viscosity of 20 seconds measured in a #4 Ford cup at 77° F. could not be sprayed satisfactorily using electrostatic atomization. (Figure of merit=9.)

For purposes of illustration, the colloidal particle-hydrogen bonding component complex was selected using montmorillonite clay (bentonite) which was reacted with an alkyl ammonium base to provide an alkyl ammonium bentonite salt such as dimethyl dioctadecyl ammonium bentonite. Commercially available materials equivalent to the bentonite salt set forth above are known as Bentones and are illustrated by Bentone 34 and Bentone 38 (National Lead Co.). Dimethyl dioctadecyl ammonium bentonite salt was used in the present example and is referred to hereinafter as the bentonite salt.

The above selection is made to emphasize the unique character of the invention since Bentones are known thickening agents and are specifically known to possess the capacity of preventing mechanical disruption of paints into fine particles. Thus, Bentones are known to prevent misting or fogging of printing inks in high speed printing.

Interestingly, it is known to include Bentones together with small amounts of polar solvents (20–60% by weight based on the weight of the Bentone) in paints. The purpose is a thickening one to improve brushability by providing a paint which is thixotropic and which decreases in viscosity during brushing and then increases in viscosity after brushing to prevent running or sagging. The prior art Bentone including paints are not adapted for mechanical spray application since the thickening action of the Bentone hinders mechanical disruption of the paint into a finely atomized spray. In the invention a larger proportion of polar solvent is used, substantially avoiding the normally desired thickening action so that the over-all rheology of the paint is not greatly altered, although localized stiffening in accordance with the electro-viscous effect may still take place.

12

The results achieved using methyl isobutyl ketone as the polar solvent with 2.6% by weight based on pigment of dimethyl dioctadecyl ammonium bentonite salt demonstrate the invention.

TABLE I.—USE OF METHYL ISOBUTYL KETONE IN THE THE OIL-ALKYD PAINT OF EXAMPLE I THINNED TO 20 SECONDS IN #4 FORD CUP AT 25° C. WITH MINERAL SPIRITS

| Percent of methyl isobutyl ketone based on paint | Percent of bentonite salt based on pigment | Conductivity | | Figure of merit |
|---|---|---|---|---|
| | | D.C. 100 kv. μa. | A.C. 2 kv. μa. | |
| 4 | 0 | 0.5 | 12.5 | 16 |
| 4 | 2.6 | 1.5 | 11 | 15 |
| 7.5 | 0 | .8 | 12.5 | 20 |
| 7.5 | 2.6 | 3.0 | 12.2 | 25 |
| 11.5 | 0 | 1.3 | 13 | 13 |
| 11.5 | 2.6 | 6.9 | 14 | 29 |
| 14.5 | 0 | 2.0 | 15 | 16 |
| 14.5 | 2.6 | 19.1 | 18.5 | 59 |

The advantage of the invention will be apparent from Table I.

Interestingly, A.C. conductivity measured at 2 kv. ranged from 11–18.5, which is not significantly different from the A.C. conductivity noted before bentonite salt addition. D.C. conductivity increased from 0.5 at 4% ketone to 19.1 at 14.5% ketone illustrating the fact that D.C. conductivity, which includes the conductivity of the oriented and distorted complexes, provides a correlation with the results of the invention which is independent of the A.C. conductivity. A.C. conductivity measures the electrical characteristics of the continuum as opposed to including the character of the dispersed particles which normally do not effect electrostatic sprayability but which uniquely possess this effect in combination in accordance with the invention.

Similar results are obtained using butyl acetate instead of methyl isobutyl ketone as the third component in paints based on the paint of Example I, butyl acetate having a Gordy number of about 88 and also being a less preferred material. At 12% butyl acetate the figure of merit had increased to about 12. In the presence of the bentonite salt, the figure of merit at 12% butyl acetate content had increased to 20.

Similarly, methyl Cellosolve having a Gordy number of about 110 was only effective when present in an amount of 4% to increase the figure of merit to 11 as against 9 for the paint free of methyl Cellosolve. On the other hand, in the presence of 4% methyl Cellosolve and 2.6% based on pigment of bentonite salt, the figure of merit increased to 27.

While methyl isobutyl ketone, butyl acetate and methyl Cellosolve, though less preferred, are capable of providing marked improvement in electrostatic sprayability, these solvents are generally required to be used in larger proportions than is necessary when preferred polar solvents having a Gordy number below 50 are used. This is illustrated by the use of nitroparaffins having a Gordy number of less than 50.

With nitromethane at 4.3% and 9.4% and in the absence of bentonite salt, the figure of merit ranged from 15–35. In the presence of 2.6% bentonite salt based on the pigment and 6.4% nitromethane, the figure of merit increased to 64.

Results using nitropropane will be apparent from Table II which follows:

TABLE II.—USE OF 2-NITROPROPANE IN THE OIL-ALKYD PAINT OF EXAMPLE I THINNED TO 20 SECONDS IN #4 FORD CUP AT 25° C. WITH MINERAL SPIRITS

| Percent of 2-nitropropane based on paint | Percent of bentonite salt (on pigment) | Conductivity | | Figure of merit |
|---|---|---|---|---|
| | | D.C. 100 kv. in μa | A.C. 2 kv. in μa | |
| 3.7 | 0 | 0.75 | 12.5 | 17 |
| 3.1 | 0.5 | 1.2 | 12 | 22 |
| 6.0 | 0 | 1.0 | 13 | 25 |
| 5.2 | 0.5 | 3.9 | 13 | 38 |
| 9.2 | 0 | 3.5 | 15 | 27 |
| 7.8 | 0.5 | 10.5 | 17 | 44 |

In the above table approximately comparable runs with and without bentonite salt are grouped in pairs for ease of comparison.

Using nitromethane with xylene as the major solvent component of the paint in place of mineral spirits in the paint of Example I, the figure of merit was 27 at 4% nitromethane and 43 at 8% nitromethane. In the presence of 2.6% bentonite salt based on the pigment, the figure of merit was raised from 27 to 64 at 4% nitromethane and from 43 to 73 at 8% nitromethane.

The improved electrostatic sprayability achieved at high solution viscosity is illustrated in Example II which follows.

*Example II*

Paint type:
  Vehicle—soya alkyd of Example I thinned in mineral spirits to 60% solids
  Pigment—titanium dioxide, rutile
Paint formula in parts by weight:
  Titanium dioxide _____ 38.0
  Alkyd solution _____ 61.0
  Cobalt naphthenate drier, 4% solution _____ 0.10
  Lead naphthenate drier, 24% solution _____ 0.80
  Calcium naphthenate drier activator,
    8% solution _____ 0.10

The viscosity of the finished formula is 90 seconds in a #4 Ford cup at 77° F. This formula will not spray.

Upon addition of xylol thinner in amounts sufficient to reduce viscosity of respective samples to 60 and 20 seconds, the paint still sprays poorly. The figures of merit for the 80, 60 and 20 seconds viscosity paints are respectively 0, 0 and 9. The reduction of viscosity with xylol marginally and inadequately improved sprayability.

Using the same 90 second viscosity formula and adding dimethyl dioctadecyl ammonium bentonite salt together with a proportion of high dielectric constant polar solvent component provided a significant improvement as shown in Table III where the additions are expressed in parts by weight per 100 parts of the 90 second paint formulation.

TABLE III

| Parts bentonite salt* | Parts butyl acetate | Parts nitromethane | Parts xylol diluent added to provide stated viscosity | #4 Ford cup viscosity 77° F. | Figure of merit |
|---|---|---|---|---|---|
| 2.6 | 6.4 | 6.4 | 11.4 | 20 | 39 |
| 0 | 6.4 | 6.4 | | 20 | 20 |
| 2.6 | 3.2 | 3.2 | 8.5 | 55 | 21 |
| 0 | 3.2 | 3.2 | | 55 | 1 |
| 2.6 | 2.5 | 2.5 | 8.7 | 80 | 11 |
| 0 | 2.4 | 2.4 | | 80 | 1 |

*Dimethyl dioctadecyl ammonium bentonite.

*Example IIA*

This example illustrates the improvement which may be achieved in a paint in which the particulate component is constituted by high molecular weight resinous fragments. The results achieved are set forth in Table IV in which the improvement may be noted by observing the increase in wraparound and band width. In this example it was not feasible to obtain adequate photographs from which particle size may be measured because of the transparency of the particles in flight. Accordingly, figure of merit could not be calculated. To aid in estimating the extent of improvement, spot size in mils is presented instead of particle size. "Spot size" is defined as the average diameter of the ten largest discrete spots of the spray pattern deposited on a 4" by 6" flat smooth metal sheet moved through the spray. "Particle size" is defined as the average diameter of the spray particles photographed in flight.

SPAR VARNISH COMPOSITION

| | Parts |
|---|---|
| Oil-soluble phenolic resin [1] | 183 |
| Tung oil [2] | 360 |
| Mineral spirits | 87 |
| Naphtha | 340 |
| Lead naphthenate (24%) | 20 |
| Cobalt naphthenate (6%) | 10 |

[1] The phenolic resin was made by condensing 2 mols of formaldehyde with 1 mol of p-tert-butylphenol in aqueous medium in the presence of phosphoric acid catalyst. Water was supplied with the formaldehyde component which was introduced as a 37% water solution. The condensation was conducted under reflux until a pot temperature of 140° C. is obtained. The reaction product is neutralized and washed with water.

[2] The phenolic resin was cooked with the tung oil component at 475° F. until a specimen withdrawn from the mixture formed a clear supercooled bead. At this point the mixture was cooled below 300° F. and the solvents and driers were added with agitation.

TABLE IV.—USE OF POLAR SOLVENT AND AMINE IN THE SPAR VARNISH DESCRIBED, THINNED WITH MINERAL SPIRITS TO 20 SECONDS, #4 FORD CUP, MEASURED AT 25° C.

| 100 kv. D.C. μa | 2 kv. A.C. μa | Band width (in.) | Percent wraparound | Polar solv. | Percent polar solv. | 2nd component | Spot size, mils |
|---|---|---|---|---|---|---|---|
| 1.2 | 11.5 | 5.75 | 1 | None | None | None | 41 |
| 1.5 | 12.5 | 6 | 4.7 | Butyl acetate nitromethane, 3:1 | 10 | None | 41 |
| 27 | 26 | 9 | 10.1 | ___do___ | 10 | 1% triethyl amine. | 14.7 |

The examples which follow illustrate the invention in its application to a variety of different types of paints and coating compositions, all measurements being made upon liquids thinned to 20 seconds viscosity measured in a No. 4 Ford cup at 77° F.

*Example III*

ACRYLIC ESTER RESIN COATING

| | Parts |
|---|---|
| Titanium dioxide | 15 |
| Octadecyl methacrylate polymerized in the presence of 0.05% benzoyl peroxide based on monomers (30% solution in toluol) | 75 |
| Plasticizer, butyl benzyl phthalate | 2 |
| Toluol | 8 |
| | 100 |

This coating composition diluted with toluol had a figure of merit of 17. The same paint containing 0.5% triethylamine and 5% Cellosolve acetate had a figure of merit of 35.

*Example IV*

ORGANOSOL

| | Parts |
|---|---|
| Vinyl chloride/vinyl acetate copolymer (95/5), Brookfield viscosity 3600/3240 cps | 9.5 |
| Polyvinyl chloride, Brookfield viscosity 53,000/12,500 cps | 22 |
| Dioctyl-phthalate | 6.5 |
| Chlorinated biphenyl (54%) | 19 |
| Pigment-calcium carbonate (precipitated), 10 micron particle size | 1.6 |

| | Parts |
|---|---|
| Mica, 15 micron particle diam | 14 |
| Dibasic lead phosphate | .6 |
| Dibasic lead phthalate | 1.0 |
| Aromatic naphtha | 16 |
| Di-isobutyl-ketone | 9.8 |
| | 100 |

The original organosol possessed a figure of merit of 16. Upon addition of .25% dimethyl dioctadecyl ammonium bentonite and 6% of butyl acetate based on the paint as partial replacement for the naphtha component, the figure of merit went up to 28.

Example V

VINYL COATING (CLEAR)

| | Parts |
|---|---|
| Vinyl chloride/vinyl acetate copolymer (87/13), mol. wt.=15,000 | 26 |
| Vinyl chloride/vinyl acetate/maleic acid copolymer (86/13/1), mol. wt.=15,000 | 8.7 |
| Cellosolve acetate | 7.7 |
| Toluol | 54 |
| Acetone | 3.6 |
| | 100 |

The addition of .25% triethylamine and 5% methyl ethyl ketone as partial replacement for the toluol component substantially improved sprayability. The figure of merit increased from 11 to 35.

Example VI

ALKYD-MELAMINE BAKING ENAMEL

| | Parts |
|---|---|
| Titanium dioxide, rutile | 17.0 |
| Soya, medium length, pure alkyd (glycerol and phthalic anhydride in 1.5:1 mol ratio), 50% in xylol | 56.4 |
| Butylated melamine resin (55% solids)[1] | 9.2 |
| Xylol | 17.4 |
| | 100 |

[1] The butylated melamine resin was produced by heat-reacting under reflux 6 mols of formaldehyde with 1 mole of melamine and 1.5 moles of butanol in the presence of oxalic acid (0.1%) to acidify the butanol in the reaction. After reaction, the batch was then neutralized. The resin produced in this way in solid form was dissolved in a 50–50 xylol-butanol solution to provide a 55% resin solids solution.

The original alkyd-melamine paint showed a figure of merit of 11. The addition of ½% dimethyl dioctadecyl ammonium bentonite and butyl acetate-methyl ethyl ketone (50–50) to provide a concentration thereof of 6% based on the paint gave a figure of merit of 43.

Example VII

CHLORINATED RUBBER PAINT

| | Parts |
|---|---|
| Titanium dioxide | 24.2 |
| Dibasic lead phosphate | 1.4 |
| Chlorinated rubber, 67% chlorine content by weight | 12.0 |
| Linseed oil modified alkyd (viscosity $Z_1$–$Z_4$; 35% phthalic anhydride; 46% linoleic acid; balance glycerol; acid No. 4–8) | 12.0 |
| Epichlorohydrin | .1 |
| Xylol | 50 |
| Lead naphthenate (24%) | .2 |
| Cobalt naphthenate (6%) | .1 |
| | 100 |

The above paint sprayed poorly (figure of merit=6). Upon reformulation to include 2.6% of dimethyl dioctadecyl ammonium bentonite based on pigment and 6% of Cellosolve acetate as partial replacement for xylol, the figure of merit increased to 28.

Example VIII

ASPHALT PAINT (FOR METAL SURFACES)

| | Parts |
|---|---|
| Gilsonite | 20 |
| Linseed oil (alkaline refined, viscosity $A_1$–A, Gardner-Holdt) | 35 |
| Linseed oil (head bodied, viscosity Q, Gardner-Holdt) | 12 |
| Mineral spirits | 30 |
| Turpentine | 3 |
| | 100 |

This asphalt paint had a figure of merit of 4. Upon reformulation to include 2.6% of dimethyl dioctadecyl ammonium bentonite based on resin content, and methyl ethyl ketone at 6% concentration in partial replacement of mineral spirits, a figure of merit of 23 was obtained.

Example IX

RED-LEAD ALKYD PRIMER

| | Parts |
|---|---|
| Red lead pigment (97% lead oxide) | 68 |
| Alkyd resin (60% resin solids)[1] | 26 |
| Mineral spirits | 5.9 |
| Cobalt naphthenate (6% Co) | .1 |

[1] The alkyd is made of 65% soya fatty acids, 11% linseed oil fatty acids and 24% phthalic anhydride. (60% solution in mineral spirits), acid No. 5–10, viscosity (reduced) F, Gardner-Holdt.

This paint had a figure of merit of 11. Upon reformulation to include 2.6% dimethyl dioctadecyl ammonium bentonite, based on pigment, and 5% Cellosolve acetate in place of the mineral spirits, the figure of merit was 29.

Example X

INTERIOR FLAT WHITE

| | Parts |
|---|---|
| Titanium dioxide (anatase) | 5.2 |
| Micronized mica (15 microns diam.) | 10.5 |
| Aluminum silicate (14 microns diam.) | 21.0 |
| Zinc oxide | .5 |
| Phthalic anhydride alkyd (60% resin solids in mineral spirits, 11% phthalic anhydride, balance glycerol; viscosity Z, Gardner-Holdt; acid No. 21) | 24.2 |
| Mineral spirits | 37.0 |
| Lead naphthenate | .8 |
| Cobalt naphthenate | .4 |
| Soya lecithin | .4 |
| | 100 |

This paint had a figure of merit of 9. Upon reformulation to include 2.6% dimethyl dioctadecyl ammonium bentonite and 6% ethylene glycol monomethyl ether as partial replacement for mineral spirits, a figure of merit of 39 was obtained.

Example XI

The invention finds striking illustration in its application to the following linseed oil house paint:

| | Parts |
|---|---|
| $TiO_2$ (anatase) | 12 |
| Titanium dioxide (rutile) | 40 |
| Zinc oxide | 15 |
| Bodied linseed oil [1] | 25 |
| Mineral spirits | 7 |
| Driers (8 parts 24% lead naphthenate—.2 part 6% cobalt naphthenate) | 1 |
| | 100 |

[1] Bodied linseed oil (Z viscosity, Gardner-Holdt). The linseed oil is polymerized at 280° C. in an aluminum kettle, stirred continuously for 12 hours until an acid value of 5 is reached.

The advantage achieved will be apparent from Table V which follows:

TABLE V.—MODIFICATION OF LINSEED TYPE HOUSE PAINT THROUGH ADDITION OF POLAR SOLVENT AND AMINATED CLAY. THINNED TO 20 SECONDS, #4 FORD CUP AT 25° C.

| 100 kv. D.C. μa | 2 kv. A.C. μa | Band width (in.) | Avg. particle size | Percent wrap-around | Fig. of merit | Percent Methyl ethyl ketone | Percent Bentonite salt* based on pigment |
|---|---|---|---|---|---|---|---|
| 2.3 | 13 | 4 | 0.0043 | 0.2 | 1 | 0 | 0 |
| 4.9 | 16 | 5 | .0030 | 3.4 | 6 | 7.0 | 0 |
| 2.1 | 13 | 5.5 | .0031 | 2.5 | 4 | 0 | 1.2 |
| 17 | 23 | 9.5 | .0021 | 7.2 | 32 | 7.1 | 1.2 |

*Dimethyl dioctadecyl ammonium bentonite roller milled into pigment.

*Example XII*

EPOXY PRIMER (BAKING TYPE)

|  | Parts |
|---|---|
| Titanium dioxide, rutile | 21 |
| Lampblack | .4 |
| Magnesium silicate | 10 |
| Barium sulfate | 20 |
| Tall oil epoxy ester resin (50% resin solids)[1] | 26 |
| Hi-Flash naphtha | 16 |
| Mineral spirits | 6.6 |
|  | 100 |

[1] Type resin used in formula (tall oil epoxy ester resin produced by the co-polymerization of):

|  | Parts |
|---|---|
| Phthalic anhydride | 18.5 |
| Tall oil (refined) | 48 |
| Epoxy resin from epichlorohydrin and bisphenol A (mol. wt.=900, epoxy equivalency=2) (epoxide equivalent 450) | 22 |
| Glycerol | 11.5 |
|  | 100 |

Grind 18 hours in a steel ball mill and thin down to 20 seconds, #4 Ford cup with xylene.

The advantage achieved is shown in Table VI.

TABLE VI.—MODIFICATION OF EPOXY PRIMER (VISCOSITY REDUCED TO 16 SECONDS BY POLAR SOLVENT ADDITION)

| 100 kv. D.C. μa | 2 kv. A.C. μa | Band width (in.) | Avg. particle size | Percent wrap-around | Fig. of merit | Polar solv. | Percent polar solv. | Percent bentonite salt* based on pigment |
|---|---|---|---|---|---|---|---|---|
| 3.5 | 11.5 | 3.75 | 0.0026 | 2.0 | 3 | Isopropyl alcohol | 7.2 | 0 |
| 5 | 12.7 | 4.5 | .0021 | 3.1 | 7 | Ethylene glycol monomethyl ether. | 7.2 | 0 |
| 35 | 28 | 9 | .0017 | 7.3 | 39 | Ethylene glycol monomethyl ether. | 9.7 | 1.2 |

*Dimethyl dioctadecyl ammonium bentonite salt roller milled into pigment.

*Example XIII*

RED OXIDE EPOXY PRIMER

|  | Parts |
|---|---|
| Iron oxide | 53 |
| Alkyd resin (epoxy resin (mol. wt.=900, epoxy equivalency=2), 1 mol phthalic anhydride, 2.5 mols linseed oil fatty acid, 1 mol (74% reacted)) | 21 |
| Heat-hardening urea-formaldehyde resin (60% resin solids) in xylol plus butanol (50:50) | 1 |
| Xylol | 12 |
| Hi-Flash naphtha | 13 |
|  | 100 |

Grind 18 hours in a steel ball mill, and thin down to 16 seconds, #4 Ford cup, with xylene.

TABLE VII.—MODIFICATION OF RED EPOXY PRIMER

| Viscosity, #3 F.C. (sec.) | 100 kv. D.C. μa | Band width (in.) | Percent wrap-around | Solvent mix used as thinner | Percent polar solv. | Percent bentonite salt* based on pigment |
|---|---|---|---|---|---|---|
| 15 | 2.1 | 5.25 | 3.0 | Xylene | 0 | 0 |
| 15 | 2.7 | 5.0 | 5.9 | Xylene: 2-nitropropane, 1:1. | 6.2 | 0 |
| 16 | 4.2 | 7.0 | 7.6 | Xylene: 2-nitropropane, 1:1. | 5.8 | 1.2 |

*Dimethyl dioctadecyl ammonium bentonite ball milled into pigment

Adequate photographs could not be made because of the transparency of the particles in flight and therefore figure of merit is not reported and improvement may be seen from increased band width and wraparound.

A feature of the invention is the electrostatic spraying of heavily loaded undercoating compositions such as primers, primer surfaces and surfacing compositions which comprise an oil fatty acid esters of a resinous intermediate having a plurality of hydroxy functionalities dissolved in an organic solvent and containing metal oxide pigment filler material, and particularly red iron oxide as the major particulate filler, the total filler content being in excess of about 35% by volume based on the combined volume of filler and resin. These heavily loaded primers do not normally respond well to electrostatic atomization and deposition and leveling difficulties are encountered in the deposited film. The invention improves atomization and film flow on deposition with minimum modification of the primer composition and without encountering running and sagging in deposited films of desired thickness.

This aspect of the invention is illustrated by the use of an amphoteric metal soap of a linear or cyclic aliphatic hydrocarbon monocarboxylate which does not possess drier activity and which is preferably used in the absence of driers.

Thus, zinc naphthenate is milled into association with the red oxide pigment.

It is essential that the primer include from 3–15%, preferably from 3–8%, by weight based on the weight of the paint of a polar solvent having a dielectric constant above 15 and preferably also a low Gordy number in addition to the soap.

The polar solvent which is selected should, for safety reasons, have a flash point above 50° C., preferably above 75° C., and preferably should possess a Gordy number of less than 50. Nitroparaffins such as nitropropane are of outstanding value. Nitrohydroxy compounds like 2-nitro-1 butanol or aminohydroxy compounds like 2-amino-1 butanol may also be used.

Accordingly, this aspect of the invention will be illustrated using zinc naphthenate and a minimum proportion of nitropropane consistent with the achievement of superior atomization and deposition.

The resins which are employed in the primers under consideration comprise oil fatty acid esters of a resinous intermediate having a plurality of hydroxy functionalities. These are typified by alkyd resins produced by condensing a polyol such as glycerol or glycerol in admixture with glycols such as ethylene or propylene glycol, or glycerol in admixture with pentaerythritol, with a dicarboxylic material or an anhydride thereof such as maleic acid or anhydride, fumaric acid or anhydride, or phthalic acid or anhydride, etc. The condensate is then cooked with an oil or an oil fatty acid, particularly a drying oil such as linseed oil, soya oil or chinawood oil to esterify the hydroxy groups remaining in the alkyd intermediate.

These oil-modified alkyd resins are desirably employed together with hardening resins which may be employed in an amount of from 10–40% by weight based on the weight of the resin mixture.

The hardening resin component is desirably a mixture of an epoxy resin with a heat-hardening, solvent-soluble urea-formaldehyde resin.

The epoxy resins are preferably based on aromatic diols and particularly on bisphenols such as bisphenol A which are reacted with epichlorohydrin to form glycidyl polyethers of bisphenol. Polyether polyepoxides so produced having a 1,2 epoxy equivalency of from 1.4–2 and a molecular weight of at least about 360 are preferred. Desirably the epoxy resin should have a molecular weight of from 1000–4000.

The epoxy resin and the solvent-soluble urea formaldehyde resin are desirably used in admixture in ratios of from 3:1 to 1:3.

Heat-hardening phenol-formaldehyde condensates in a solvent-soluble "B" stage may also be used. These are prepared by reacting a phenol such as phenol itself with at least 0.8 mols of formaldehyde per mol of phenol. The reaction is desirably performed in alkaline medium, though this is not essential.

Example XIV illustrates a preferred primer which cannot be adequately electrostatically atomized and deposited.

Example XIV

Resin—16 parts constituted by
(1) 75% of an oil-modified alkyd resin produced by reacting glycerol and phthalic anhydride and then cooking the alkyd resin so produced with soya oil in a molecular ratio of oil fatty acid to phthalic carboxyl of 1.0:1.0 to provide a clear solution;
(2) 15% of a diglycidyl ether of bisphenol A having an average molecular weight of 1850, a melting point of 95–105° C., an epoxy value of 0.11 and a hydroxyl value of 0.34.
(3) 10% of a solvent-soluble urea-formaldehyde resin provided as a 50% resin solids solution in a 50:50 mixture of butanol and mineral spirits, the resin being prepared by polymerizing and etherifying dimethylol urea in an excess of butanol by heating in the presence of phosphoric acid, azeotropically distilling off water and then neutralizing the resin so produced.

Pigment—56 parts of red iron oxide
Solvent—28 parts
   2.5 parts of butanol
   12.5 parts of mineral spirits
   13 parts xylene The primer was prepared by grinding the pigment into the resin in a ball mill using part of the solvent as necessary to obtain proper cascading in the ball mill.

Upon electrostatic atomization and deposition of the primer set forth above, electrostatic atomization was fair but the film did not level and contained hills and valleys necessitating extensive sanding.

Example XV

The primer of Example XIV was modified by the addition of further xylene. Leveling improved but adequate film thicknesses could not be deposited without running and sagging.

Example XVI

The primer of Example XIV was modified by replacing portions of the non-polar hydrocarbon solvents (mineral spirits and xylene) with polar solvents such as butyl acetate, Cellosolve, butanol, acrylonitrile monomer and nitropropane. In each instance, adequate leveling could not be achieved.

Example XVII

The primer of Example XIV was modified by incorporating 0.0001, 0.001, 0.01, 0.1 and 1 part of zinc naphthenate with the red iron oxide pigment prior to grinding the pigment into the resin. Adequate leveling was not achieved in any instance.

Example XVIII

The primer of Example XIV was modified by incorporating 0.0001 part of zinc naphthenate in with the red iron oxide pigment prior to grinding the pigment into the resin and 3 parts of xylene were replaced with 2-nitropropane. Electrostatic atomization improved significantly and adequate leveling was achieved.

Example XIX

Example XIV was repeated using 0.001 part of zinc naphthenate and 6 parts of 2-nitropropane in place of an equal amount of xylene. Electrostatic atomization and leveling improved further.

The invention is defined in the claims which follow.

I claim:

1. A method of spraying a paint composition comprising passing an electrostatic charge through an increment of paint comprising a film-forming material dispersed in an organic liquid medium, said paint comprising from 0.1–10% by weight, based on the weight of the paint, of charged colloidal particles of one sign having a diameter of at least about 1000 A. and mobile counter-ions associated therewith, said charged particles being dispersed in a paint continuum comprising from 3–25% by weight, based on the weight of the paint, of a polar component having a dielectric constant in excess of 8.

2. A method as recited in claim 1 in which said film-forming material is a resin dissolved in said paint continuum and said polar component is a solvent for said resin, said solvent having a Gordy number less than 100.

3. A method as recited in claim 2 in which said polar solvent is methyl ethyl ketone.

4. A method as recited in claim 2 in which said polar solvent is nitropropane.

5. A method as recited in claim 2 in which said polar solvent is nitromethane.

6. A method as recited in claim 1 in which said polar component has a Gordy number less than 50, a dielectric constant of from 20–40 and is present in an amount of from 3–8% by weight.

7. A method as recited in claim 1 in which said charged colloidal particles and mobile counter-ions associated therewith are formed by dissociation of a complex of dispersed particles having adsorbed thereon a plurality of surrounding molecules of material having a Gordy number in excess of 125.

8. A method as recited in claim 1 in which said charged colloidal particles and mobile counter-ions associated therewith are formed by dissociation of a particulate component associated by hydrogen bonds with a plurality of surrounding molecules of material having a Gordy number in excess of 125.

9. A method as recited in claim 8 in which said material having a Gordy number in excess of 125 is an organic amine.

10. A method as recited in claim 8 in which said polar component has a Gordy number less than 50, a dielectric constant of from 20–40 and is present in an amount of from 3–8% by weight.

11. A method as recited in claim 10 in which said particulate component is associated with molecules of material having a Gordy number in excess of 200.

12. A method as recited in claim 8 in which said charged colloidal particles and mobile counter-ions associated therewith are formed by dissociation of particles of acidic clay having a base exchange capacity of from 15–100 milliequivalents of exchangeable ion per grams of clay associated by hydrogen bonds with a plurality of surrounding molecules of material having a Gordy number in excess of 125.

13. A method as recited in claim 12 in which said acidic clay is a montmorillonite clay.

14. A method as recited in claim 12 in which said material having a Gordy number in excess of 125 is present in an amount of from 0.1%–5% based on the weight of the paint.

15. A method as recited in claim 14 in which said material having a Gordy number in excess of 125 is present in an amount not in excess of 50% of the stoichiometric amount based on the total number of hydrogen bonds which can be formed with said acidic clay.

16. A method as recited in claim 12 in which said material having a Gordy number in excess of 125 is an organic nitrogen base.

17. A method of spraying a paint composition comprising passing an electrostatic charge through an increment of paint comprising a film-forming resin having a dielectric constant less than 7 dissolved in an organic liquid medium, said paint comprising from 0.1–10% by weight, based on the weight of the paint, of charged colloidal particles of one sign having a diameter of at least 1000 A. and mobile counter-ions associated therewith, said charged particles and counter-ions being formed by dissociation of a particulate component associated by hydrogen bonds with a plurality of surrounding molecules of material having a Gordy number in excess of 125, said charged particles being dispersed in a paint continuum comprising from 3–8% by weight, based on the weight of the paint, of a liquid polar organic solvent having a Gordy number less than 50 and a dielectric constant of from 20–40.

18. A method of spraying a paint composition comprising passing an electrostatic charge through an increment of paint comprising an oil-modified alkyd resin dissolved in an organic liquid solvent, said paint comprising from 0.1–10% by weight, based on the weight of the paint, of charged colloidal particles of one sign having a diameter of at least about 1000 A. and mobile counter-ions associated therewith, said charged particles and counter-ions being formed by dissociation of particles of acidic clay having a base exchange capacity of from 15–100 milliequivalents of exchangeable ion per 100 grams of clay associated by hydrogen bonds with a plurality of surrounding molecules of material having a Gordy number in excess of 125, said charged particles being dispersed in a paint continuum comprising from 3–25% by weight, based on the weight of the paint, of a polar liquid organic solvent for said resin having a dielectric constant in excess of 8 and a Gordy number less than 100.

19. A method as recited in claim 18 in which said charged particles and counter-ions are formed by dissociation of an alkyl ammonium bentonite salt.

20. A method as recited in claim 19 in which said salt is dimethyl dioctadecyl ammonium bentonite.

21. A method as recited in claim 18 in which said counter-ions are organic amine radicals.

22. A method of spraying a paint composition comprising passing an electrostatic charge through an increment of paint comprising a film-forming material having a dielectric constant less than 10 dispersed in an organic liquid medium, said paint comprising from 0.1–10% by weight, based on the weight of the paint, of charged colloidal particles of one sign having a diameter of at least about 1000 A. and mobile counter-ions associated therewith, said charged particles and counter-ions being formed by dissociation of a metal oxide pigment associated with a plurality of surrounding molecules of an amphoteric metal solvent-soluble soap of an aliphatic monocarboxylic acid, said soap having no drier activity, said charged particles being dispersed in a paint continuum comprising from 3–25% by weight, based on the weight of the paint, of a polar component having a dielectric constant in excess of 8.

23. A method as recited in claim 22 in which said amphoteric metal is zinc.

24. A method as recited in claim 23 in which said soap is zinc naphthenate.

25. A method as recited in claim 22 in which said amphoteric metal is calcium.

26. A method of spraying a paint composition comprising passing an electrostatic charge through an increment of paint comprising a film-forming material dispersed in an organic liquid medium, said paint containing from 0.1–10% by weight, based on the weight of the paint, of charged particles of limited electrophoretic mobility dispersed in a paint continuum having dissolved therein from 3–25% by weight, based on the weight of the paint, of a polar component having a dielectric constant in excess of 8, said charged particles of limited electrophoretic mobility having a multiplicity of charges of one charge sign per particle and mobile neutralizing counter-ions of opposite charge sign associated with said charged particles of limited electrophoretic mobility.

27. A method of spraying a paint composition as recited in claim 26 in which said film-forming material has a dielectric constant less than 10 and is dissolved in a liquid medium comprising at least 3% by weight, based on the weight of the paint, of a polar organic solvent having a dielectric constant in excess of 8.

28. A method of modifying a paint comprising pigment and film-forming material having a dielectric constant less than 10 dispersed in an organic liquid medium to adapt said paint for electrostatic atomization and deposition comprising incorporating in said paint from 0.1–10% by weight based on the weight of the paint of colloidal particles having a diameter of at least 1000 A. associated with molecules of material having a Gordy number in excess of 125 in the presence of from 3–25% by weight based on the weight of the paint of a polar component having a dielectric constant in excess of 8 which is dissolved in the continuum of said paint to provide dispersed large immobile charged particles of one sign and mobile counter-ions associated therewith.

29. A method as recited in claim 28 in which there is incorporated in said paint from 0.1–10% by weight of an acidic clay having a base exchange capacity of from 15–100 milliequivalents of exchangeable ion per 100 grams of clay, said acidic clay being associated with an organic nitrogen base having a Gordy number in excess of 125.

30. A method as recited in claim 29 in which said nitrogen base has a molecular weight in excess of 300.

31. A method as recited in claim 28 in which there is incorporated in said paint from 0.1–2% by weight of dimethyl dioctadecyl ammonium bentonite.

References Cited in the file of this patent

UNITED STATES PATENTS

| | | |
|---|---|---|
| 2,523,650 | Dickson | Sept. 22, 1950 |
| 2,551,035 | Miller | May 1, 1951 |
| 2,559,225 | Ransburg | July 3, 1951 |
| 2,739,067 | Ratcliffe | Mar. 20, 1956 |
| 2,804,437 | Katz et al. | Aug. 27, 1957 |
| 2,885,360 | Haden et al. | May 5, 1959 |

FOREIGN PATENTS

| | | |
|---|---|---|
| 901,958 | Germany | Jan. 18, 1954 |

OTHER REFERENCES

Muller et al.: Official Digest Federation Paint and Varnish Production Clubs, No. 294, pages 451–62, July 1949.

UNITED STATES PATENT OFFICE
CERTIFICATE OF CORRECTION

Patent No. 3,112,216                      November 26, 1963

Lester L. Spiller

It is hereby certified that error appears in the above numbered patent requiring correction and that the said Letters Patent should read as corrected below.

Column 3, line 42, for "hydrogen", first occurrence, read -- hydrogens --; column 7, line 28, for "weights" read -- weight --; column 9, line 7, for "hpysical" read -- physical --; line 66, for "componets" read -- components --; column 18, line 22, for "esters" read -- ester --; column 21, line 4, before "grams" insert -- 100 --.

Signed and sealed this 9th day of June 1964.

(SEAL)
Attest:

ERNEST W. SWIDER                     EDWARD J. BRENNER
Attesting Officer                        Commissioner of Patents